United States Patent
Kiedaisch et al.

(10) Patent No.: US 8,287,727 B2
(45) Date of Patent: Oct. 16, 2012

(54) FILTER ELEMENT IN A FUEL FILTER

(75) Inventors: Steffi Kiedaisch, Goeppingen (DE); Thorsten Schmid, Stuttgart (DE); Norbert Strassenberger, Adlkofen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 356 days.

(21) Appl. No.: 12/645,725

(22) Filed: Dec. 23, 2009

(65) Prior Publication Data

US 2010/0181246 A1  Jul. 22, 2010

(30) Foreign Application Priority Data

Dec. 23, 2008 (DE) .................. 10 2008 062 952

(51) Int. Cl.
*B01D 35/00* (2006.01)
*B01D 27/00* (2006.01)
*B01D 35/28* (2006.01)

(52) U.S. Cl. ......... 210/120; 210/436; 210/450; 210/472

(58) Field of Classification Search .................. 210/436, 210/450, 472, 443, 440, 120
See application file for complete search history.

(56) References Cited

U.S. PATENT DOCUMENTS

| | | | | |
|---|---|---|---|---|
| 6,117,311 A | * | 9/2000 | Stockhowe et al. | 210/109 |
| 6,878,275 B2 | * | 4/2005 | Yamada | 210/416.4 |
| 2008/0135469 A1 | * | 6/2008 | Fremont et al. | 210/234 |
| 2008/0210618 A1 | * | 9/2008 | Kiedaisch et al. | 210/321.61 |
| 2008/0308492 A1 | * | 12/2008 | Siegle | 210/508 |

FOREIGN PATENT DOCUMENTS

| | | |
|---|---|---|
| CN | 101267870 | 9/2008 |
| DE | 19835525 C1 | 10/1999 |
| DE | 202005014451 | 2/2007 |
| DE | 1020080629525.9 | 6/2010 |
| EP | 20060764247 | 6/2008 |
| EP | 2062634 | 5/2009 |
| WO | WO0047310 | 8/2000 |
| WO | WO2007010037 | 1/2007 |

OTHER PUBLICATIONS

EP search report for 09154890.9; PCT search report for PCT/EP2006/064510.

* cited by examiner

*Primary Examiner* — Benjamin Kurtz
(74) *Attorney, Agent, or Firm* — James Hasselbeck

(57) ABSTRACT

A filter element in a fuel filter has an annularly arranged filter medium that is sealed at the end faces by end plates wherein a venting unit for venting gases out of the filter element area is provided. The venting unit comprises a securing ring that clamps, in the mounting position, a filter body, wherein in the securing ring a through opening as well as additionally an expansion opening are provided.

17 Claims, 3 Drawing Sheets

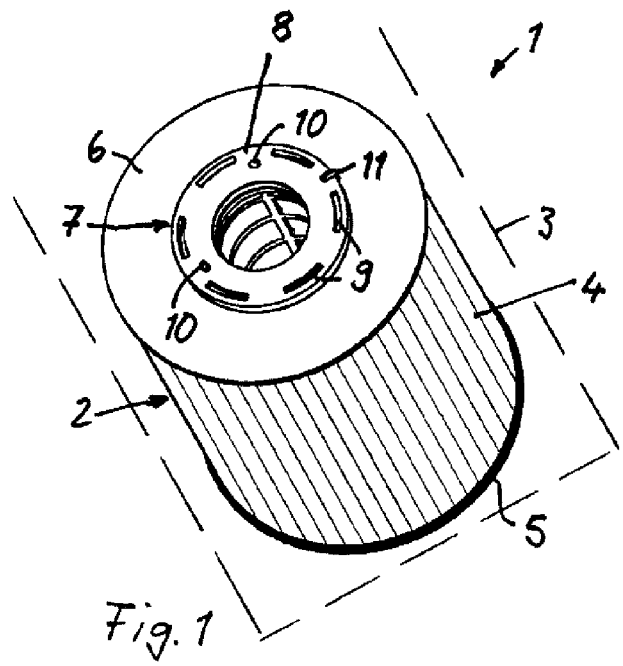
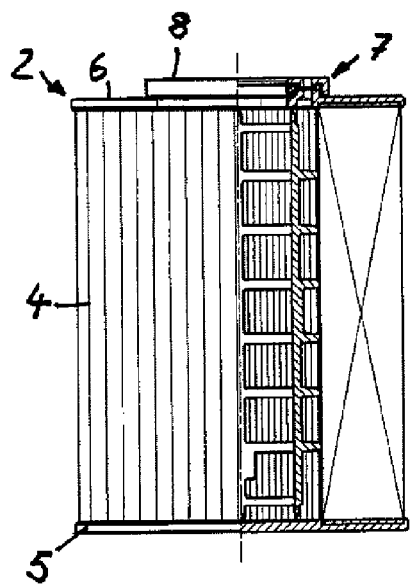
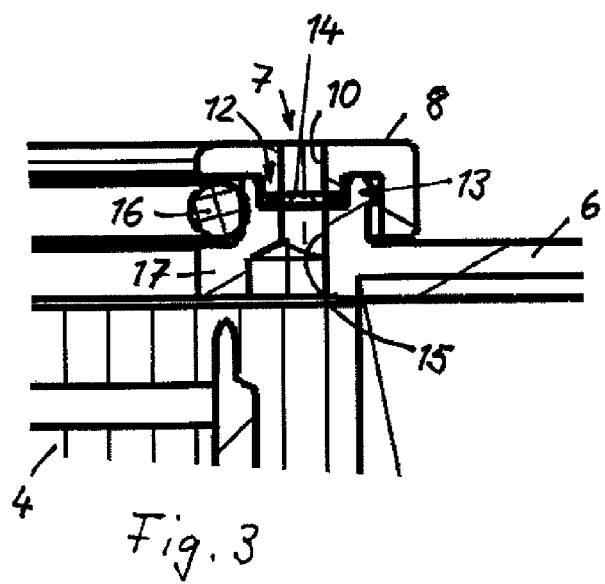
Fig. 1
Fig. 2
Fig. 3

FILTER ELEMENT IN A FUEL FILTER

CROSS REFERENCE TO RELATED APPLICATIONS

Priority is claimed based on Federal Republic of Germany patent application no. 10 2008 062 952.9, filed: Dec. 23, 2008, the entire disclosure of which is incorporated herein by reference.

TECHNICAL FIELD

The invention concerns a filter element in a fuel filter according to the preamble of claim 1.

PRIOR ART

In WO 2007/010037 A1 a fuel filter is disclosed that comprises in a filter housing a hollow-cylindrical filter element that is flowed through radially from the exterior to the interior and is comprised of a folded filter medium with end plates glued to the end faces. In order to discharge gases that collect in the end face area of the filter housing, a venting unit is provided that comprises a flow passage in one of the end plates at the end faces which flow passage connects directly the raw side with the clean side of the filter element. The venting unit comprises moreover a filter body that covers the flow passage and is clamped securely by a securing ring. By means of a radially outwardly positioned annular shoulder that is provided at its axial end face with an undercut, the securing ring is to engage in a locking connection with a corresponding annular shoulder that is formed monolithically on the end plate. When the locking connection is achieved, the filter body that covers the flow passages is also clamped at the same time. In the securing ring a through opening that corresponds with the flow passage is provided so that the flow connection between outer side and inner side of the filter element is produced.

In this embodiment of the fuel filter care must be taken that the securing ring can be moved without damage into the clamping or locking position on the end plate of the filter element. For reaching the locking position a minimal radial expansion of the securing ring is required. The same holds true for releasing the locking position, for example, in order to exchange the filter body that covers the flow passage.

Moreover, care must be taken that the filter body that is embodied as a paper filter ring in WO 2007/010037 A1 is not subjected by the clamping action by means of the securing ring to impermissibly high loads that would lead to the filter material being damaged.

The invention has the object to provide with simple constructive measures a filter element for a fuel filter in which even over an extended operating time an effective venting action is provided.

SUMMARY OF THE INVENTION

This object is solved according to the invention with the features of claim 1. The dependent claims provide expedient further embodiments.

The filter element according to the invention is part of a fuel filter that is used in motor vehicles with internal combustion engine for filtration of fuel. The filter element has an annularly arranged filter medium on which at the end faces end plates are arranged and that is flowed through in the radial direction by the fuel. Moreover, a venting unit for discharging gases is provided in order to be able to discharge air contained in the fuel from the raw side of the filter element. The venting unit comprises a flow passage that is provided in the end plate and directly connects the raw side with the clean side of the filter element. Moreover, the venting unit has correlated therewith a filter body which covers the flow passage so that it is ensured that no fuel can flow unfiltered through the flow passage from the raw side to the clean side. The filter body is securely clamped by a securing ring that is also a component of the venting unit and is provided with a radially outwardly positioned annular shoulder by means of which the securing ring is fastened on the end plate. In the securing ring a through opening is provided that corresponds with the flow passage.

According to the invention, it is provided that the securing ring in addition to the through opening has at least one expansion opening that extends across a limited angle segment and is arranged at a radial spacing relative to the annular shoulder. The expansion opening that extends usually in an arc shape in the circumferential direction across the limited angle segment has the function of improving the elastic behavior of the securing ring so that for mounting and demounting of the securing ring the annular shoulder provided for securing is at least minimally radially expanded and in the expanded state can be pushed across a section on the end plate or a component connected to the end plate on which the securing ring is to be fastened, in particular, by engaging in a locking or clamping connection. This embodiment improves in radial direction the elastic behavior of the securing ring without this requiring changes in the material composition of the securing ring.

Since the expansion opening is embodied independent of the through opening in the securing ring, both openings can be matched to the respective task in the best possible way. The expansion opening extends advantageously in an arc shape about the defined angle segment in the securing ring, wherein the arc shape or the extension in the circumferential direction assists the radial expansion. The through opening for the gas bubbles does not, or only insignificantly, participate in the radial expansion and is therefore also not subjected to a deformation. In this way it is ensured that the through opening, even for an extended operating time, maintains its cross-section and the prescribed position and is safely in communication with the flow passage in the end plate of the filter element.

Advantageously, a plurality of expansion openings extend adjacent to the outwardly positioned annular shoulder in the circumferential direction on the securing ring in order to enable an at least approximately uniform radial expansion in all radial directions. Each expansion opening extends in the circumferential direction about a limited angle segment so that between two neighboring expansion openings a continuous wall section of the securing ring is formed.

On the radially inwardly oriented inner side of the annular shoulder on the securing ring, in the area of the expansion opening, a projection can be formed that in the mounting position forms an undercut with the correlated annular shoulder on the end plate. In this way, a positive locking securing action of the securing ring on the end plate is possible.

According to a preferred embodiment, on the securing ring on the inner side that is facing the end disk at a radial spacing to the external ring an annularly extending and axially projecting clamping stay is formed that, in the mounting position, rests on the preferably also annularly shaped filter body and clamps it. In the clamping stay a through opening is provided that communicates with the flow passage in the end plate. In this way, a continuous flow passage through the clamping stay as well as the end plate is provided that is utilized for discharging the gas bubbles. In this flow path the annular filter body is positioned immediately adjacent to the clamping stay that forms a contact surface.

Expediently, on the clamping stay two annular projections that are concentric to one another are provided so that the side of the clamping stay that is facing the end plate is groove-shaped wherein the annular projections form the groove walls. In this connection, the projections delimit the through opening radially inwardly and outwardly. The advantage of this embodiment resides in the approximately linear pressure loading of the filter body so that it is safely secured by the securing ring wherein the through opening is located between the projections on the clamping stay so that the gas bubbles can pass unhindered through the filter body.

Expediently, the two annular projections on the clamping stay of the securing ring have correlated therewith two corresponding grooves on the end plate. These grooves are preferably located on the bottom of an annular groove that is arranged on the end plate, or a component connected to the end plate, and that forms a support surface for the clamping stay contacting it. The projections project in the mounting position into the grooves so that the clamping stay rests flat on the bottom of the annular groove and safely clamps the annular filter body inserted into the annular groove.

In order to determine a well-defined mounting position, on the securing ring advantageously a locking member is arranged that interacts with a corresponding locking member on the end plate. For example, the locking member on the securing ring is embodied as a locking recess into which a locking nose on the end plate projects. In this way, the angular position of the securing ring relative to the end plate is precisely determined so that it is also ensured that the through opening in the securing ring is precisely positioned above the flow passage in the end plate.

It can be expedient to provide the filter body with an impregnation wherein the impregnation agent is, for example, a phenolic resin. The impregnation prevents that the filter ring upon contact with water, which is contained in the fuel, will swell.

As a material for the filter body various materials can be used. Considered are, for example, an embodiment as a paper filter ring or as a ceramic filter foam. Moreover, also nonwoven fabric materials are considered, also mixed glass paper in which glass fibers are embedded in the base material of cellulose. Moreover, mixed nano fiber materials are possible in which nano fibers are embedded in a base material such as cellulose.

BRIEF DESCRIPTION OF THE DRAWINGS

Further advantages and expedient embodiments are to be taken from the further claims, the figure description, and the drawings. It is shown in:

FIG. 1 a perspective view of a filter element as a part of a fuel filter with an annularly arranged filter medium that is sealed at the end faces by end plates, respectively, wherein on the upper end face a venting unit for discharging gases in the fuel is arranged and the venting unit comprises a securing ring with cutouts provided therein;

FIG. 2 a section in longitudinal direction through the filter element according to FIG. 1;

FIG. 3 a detail view of the area of the connection of the securing ring on the end plate at the end face;

In the Figures same components are provided with same reference numerals.

EMBODIMENTS OF THE INVENTION

Figure 4:
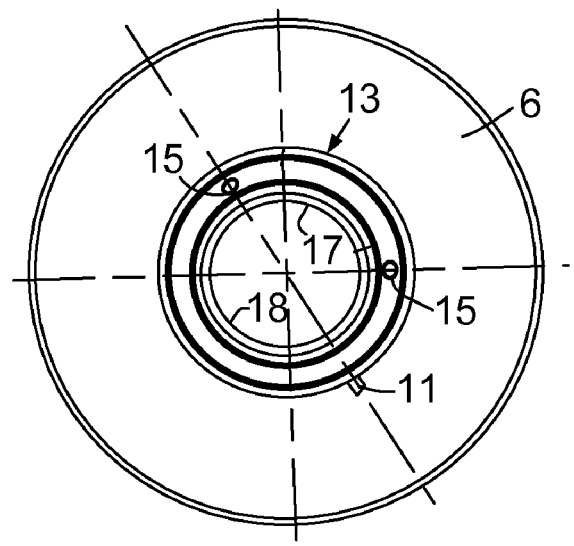
FIG. 4 the end plate in plan view.

As can be seen in FIG. 1 in connection with FIGS. 2 and 3, the fuel filter 1 has a filter element 2 in a filter housing 3 wherein the filter medium 4 of the filter element 2 is an annularly arranged filter medium, for example, of nonwoven fabric or paper or the like that, in radial direction, is flowed through from the exterior to the interior by the fuel to be purified. The filter medium 4 is of a folded configuration wherein the folds extend approximately in radial direction and, as a whole, an annular configuration of the filter medium is provided.

The filter medium 4 is sealed at each end face by an end plate 5, 6, connected to the front edges of the filter medium, in particular, by gluing. The radially outwardly positioned side of the filter medium 4 forms the raw side to which the unfiltered fuel is supplied, the radially inwardly positioned side forms the clean side where the fuel is axially discharged.

The upper geodetically top-positioned end plate 6 is provided with a venting unit 7 that makes it possible to discharge gas bubbles, in particular air, contained in the unfiltered fuel and located in the area above the end plate 6, immediately to the clean side of the filter element. For this purpose, the venting unit 7 is provided with an axial flow connection through the end plate 6 that enables an immediate discharge of gas bubbles from the raw side to the clean side by bypassing the filter medium 4.

Part of the venting unit 7 is a securing ring 8 that is provided for securing and fixation of an annular filter body 14 which in the flow connection of the venting unit is positioned between raw side and clean side and prevents that unfiltered fuel can pass through the flow connection immediately from the raw side to the clean side. The securing ring 8 is comprised particularly of plastic material, as is the end plate 6, and has a plurality of arc-shaped expansion openings 9 that are uniformly distributed about the circumference and that extend across a limited angle segment of maximally 45 degrees, in particular maximally 30 degrees. The expansion openings 9 have the function to provide the securing ring 8 with an improved radial elasticities so that the securing ring 8 in a simple way and without being damaged can be moved into a clamping or locking position at the end plate 6.

In addition to the expansion openings 9, the securing ring is provided with two through openings 10 that are part of the flow passage of the venting unit 7 between raw side and clean side of the filter element 2. The through openings 10 communicate with flow passages 15 that are provided in the end plate 6.

In FIG. 3, the venting unit 7 is shown in detail in section. In the mounted position the through opening 10 that is provided in the securing ring 8 is in communication with the flow passage 15 that is located in an annular section 13 that is monolithically formed with the upper end plate 6 and projects axially past the surface of the end plate 6. This annular section is embodied as an annular groove 13 into which a corresponding clamping stay 12 projects that is unitarily formed on the securing ring 8 and is located at the side facing the end plate 6. The bottom of the annular groove 13 on the end plate 6 forms a contact or support surface for the clamping stay 12 on the securing ring 8. Between the clamping stay 12 and the annular groove 13 an annular filter body 14 is inserted and securely clamped; it ensures that unfiltered fuel possibly passing through by means of through opening 10 is subjected to filtration. The flow connection, comprised of through opening 10 and flow passage 15 enables an axial flow of gas bubbles through the end plate 6 immediately from the raw side to the clean side.

The annular groove 13 on the end plate 6 has groove walls that are concentric to one another and positioned at a radial spacing from one another and form radially inwardly and radially outwardly a support for the inserted filter body 14. The clamping stay 12 that is inserted into the annular groove 13 is supported radially inwardly and radially outwardly by the groove walls of the annular groove 13.

On the radial inner side of the inwardly positioned groove wall of the annular groove 13 a sealing ring 16 is arranged. The sealing ring 16 is axially outwardly securely clamped by the securing ring 8. Viewed axially in the direction of the filter medium 4, the sealing ring 16 is resting on a support surface 17 that is part of the end plate 6 and delimits immediately the central outlet opening 18 (FIG. 4) of the end plate 6 which opening is provided for axial discharge of the fuel from the clean side of the filter element.

As can be seen in the plan view onto the end plate 6 according to FIG. 4, two flow passages 15 are introduced into the end plate that are positioned relative to one another at an angle of approximately 60 E relative to the axis of the end plate 6. The flow passages 15 are provided immediately within the annular groove 13 so that the mouth of the flow passages 15 is delimited by the groove walls of the annular groove radially inwardly and outwardly.

Figure 5:
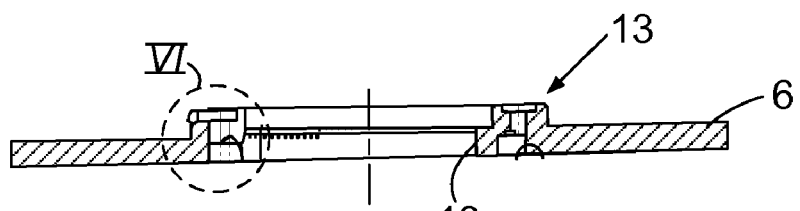
FIG. 5 the end plate in section.
Figure 6:
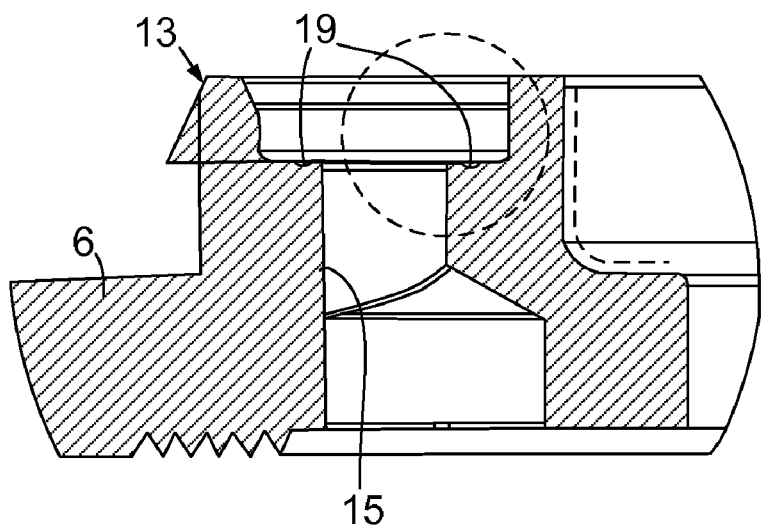
FIG. 6 a detail view of the end plate in the area of a flow passage that is provided for discharging gases.

FIG. 5 shows in connection with the detail according to FIG. 6 that at the bottom of the annular groove 13 two grooves 19 are provided that extend annularly in circumferential direction and concentrically to the groove walls at the bottom of the annular groove. The grooves 19 are radially spaced apart and extend at minimal radial spacing to the radial exterior side and interior side of the mouth of the flow passage 15.

Figure 7:
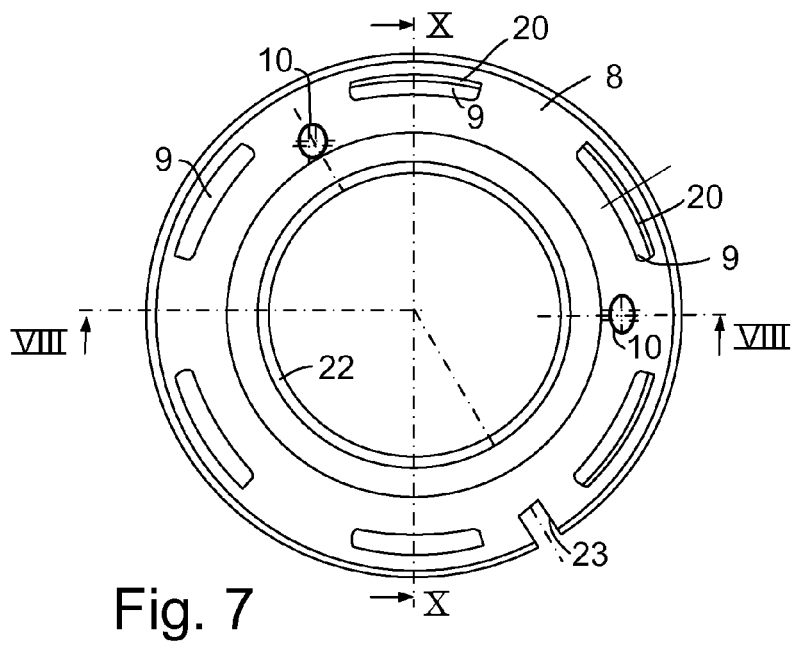
FIG. 7 a plan view onto the securing ring.
Figure 8:
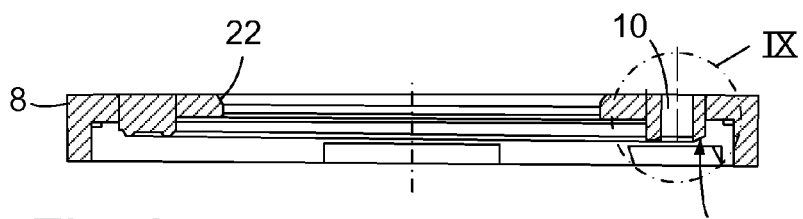
FIG. 8 a section through the securing ring.
Figure 9:
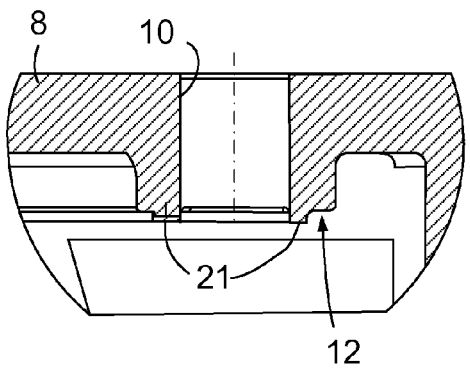
FIG. 9 a detail illustration of a section through a through opening in the securing ring that communicates with the flow passage.

In FIGS. 7 to 10 the securing ring 8 is shown in various illustrations. As can be seen in the plan view according to FIG. 7, the expansion openings 9 are radially closer to the outer rim of the securing ring 8 than the through openings 10 through which the gas bubbles are to be discharged. With such a different radial positioning of the expansion openings 9 and the through openings 10 it is ensured that the expansion openings 9 are positioned radially outside of the clamping stay 12 provided with the through openings 10 (FIGS. 8 and 9). The securing ring 8 has a central outlet opening 22 that in the mounted position corresponds with the outflow opening 18 in the end plate 6.

As shown in FIG. 8 and the detail illustration according to FIG. 9, on the axial inner side of the securing ring 8 on the clamping stay 12 two annular circumferentially extending projections 21 are formed that project axially past the end face of the wall sections delimiting the through opening 10. These projections 21 project in the mounting position into the corresponding grooves 19 (FIG. 6) that are introduced into the bottom of the annular groove 13 on the end plate 6. In this way, it is ensured that the annular filter body that is also resting at the bottom of the annular groove 13 is safely clamped by the projections 21 without impairing the flow through the through opening 10 in the securing ring 8 and the flow passage 15 in the end plate 6.

As shown also in FIG. 7, adjacent to the outer rim of the securing ring 8 a locking recess 23 is introduced that extends about a limited radial length from the outer rim into the securing ring. This locking recess 23 corresponds in the mounted position with locking nose 11 that is arranged at the end plate 6 and is located at the radial outer side of the outer annular groove wall. In this way, the angle position of the securing ring 8 in the mounting situation is determined unequivocally.

Figure 10:
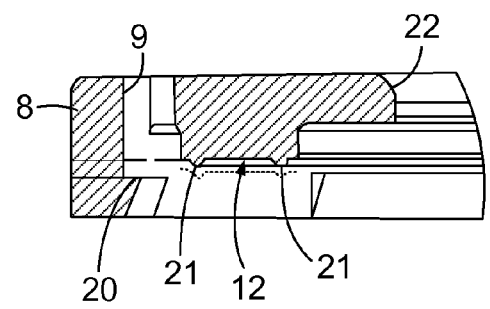
FIG. 10 a section through the securing ring in the area of an expansion opening.

FIG. 7 in connection with the detail illustration of FIG. 10 shows that on the radially limiting wall sections of the expansion openings 9 a step 20 is formed that is located on the radial outer side of the expansion opening 9. This projection 20 forms in the mounting position a positive locking interaction like an undercut with a correlated projection on the radially outwardly positioned groove wall of the annular groove 13 on the end plate 6.

The invention claimed is:

1. A filter element in a fuel filter (1), comprising:
an annularly arranged filter medium (4);
at least one end plate (5,6), said at least one end plate covering an end face of the filter medium, said at least one end plate including a venting unit (7) operable for discharging gases from a raw side of the filter element (2) to a clean side of the filter element;
wherein the venting unit (7) includes at least one flow passage (15) provided in said at least one end plate (6) between the raw side and the clean side of the filter element (2) and the at least one flow passage (15) is covered by a filter body (14) that is clamped by a securing ring (8), said filter body ensuring filtration of fuel that may pass through said venting unit from said raw to said clean side;
wherein the securing ring (8) is adapted to be fastened onto the said at least one end plate (6); and
wherein the securing ring (8) includes at least one through opening (10) in communication with the at least one flow passage (15);
wherein the securing ring (8) further includes at least one expansion opening (9) extending in an arc shape about a limited angle segment of said securing ring and is arranged at a radial spacing to an outer rim of the securing ring (8);
wherein said at least one expansion opening (9) has a smaller radial spacing to the outer rim of the securing ring (8) than to said at least one through opening (10).

2. The filter element according to claim 1, wherein said at least one expansion opening is a plurality of expansion openings (9) distributed about a circumference of said securing ring.

3. The filter element according to claim 1, wherein the at least one expansion opening (9) extends about an angle segment of maximally 45 degrees.

4. The filter element according to claim 1, wherein said at least one through opening (10) are two through openings in said securing ring (8).

5. A filter element in a fuel filter (1), comprising:
an annularly arranged filter medium (4);
at least one end plate (5,6), said at least one end plate covering an end face of the filter medium, said at least one end plate including a venting unit (7) operable for discharging gases from a raw side of the filter element (2) to a clean side of the filter element;
wherein the venting unit (7) includes at least one flow passage (15) provided in said at least one end plate (6) between the raw side and the clean side of the filter element (2) and the at least one flow passage (15) is covered by a filter body (14) that is clamped by a securing ring (8), said filter body ensuring filtration of fuel that may pass through said venting unit from said raw to said clean side;

wherein the securing ring (8) is adapted to be fastened onto said at least one end plate (6);

wherein the securing ring (8) includes at least one through opening (10) in communication with the at least one flow passage (15); and wherein a projection (20) is formed on a radially inwardly oriented inner side of the wall of the at least one expansion opening delimiting the at least one expansion opening (9).

6. A filter element in a fuel filter (1), comprising:

an annularly arranged filter medium (4);

at least one end plate (5,6), said at least one end plate covering an end face of the filter medium, said at least one end plate including a venting unit (7) operable for discharging gases from a raw side of the filter element (2) to a clean side of the filter element;

wherein the venting unit (7) includes at least one flow passage (15) provided in said at least one end plate (6) between the raw side and the clean side of the filter element (2) and the at least one flow passage (15) is covered by a filter body (14) that is clamped by a securing ring (8), said filter body ensuring filtration of fuel that may pass through said venting unit from said raw to said clean side;

wherein the securing ring (8) is adapted to be fastened onto said at least one end plate (6);

wherein the securing ring (8) includes at least one through opening (10) in communication with the at least one flow passage (15);

wherein said securing ring includes an annularly extending, axially projecting clamping stay (12) formed at a radial spacing to the outer rim;

wherein said clamping stay, when in a mounted position, rests on the filter body (14);

wherein in the clamping stay (12) said at least one through opening (10) is provided.

7. The filter element according to claim 6, wherein two concentric annular projections (21) are formed on a side of the clamping stay (12) facing the at least one end plate (6);

wherein said at least one through opening is located between said two concentric annular projections.

8. The filter element according to claim 6, wherein said at least one expansion opening (9) is positioned radially outside of the clamping stay (12).

9. The filter element according to claim 6, wherein said filter body (14) is ring shaped;

wherein an annular groove (13) is formed on the at least one end plate (6), said annular groove configured to receive said ring shaped filter body; and wherein the at least one flow passage (15) opens into the annular groove (13).

10. The filter element according to claim 7, wherein said filter body (14) is ring shaped;

wherein an annular groove (13) is formed on the at least one end plate (6), said annular groove configured to receive said ring shaped filter body;

wherein the at least one flow passage (15) opens into the annular groove (13); and wherein the annular groove (13) is correlated with the clamping stay (12) on the securing ring (8) and is provided with grooves (19) that correspond with the annular projections (21).

11. The filter element according to claim 1, wherein said securing ring includes a locking member that corresponds with a locking member on the at least one end plate (5, 6), said locking member on said securing ring acting with said corresponding locking member on said at least one end plate determining an unequivocal mounting position of the securing ring (8) on the at least one end plate.

12. The filter element according to claim 11, wherein the locking member on the securing ring (8) is embodied as a locking recess (23) introduced into the outer rim of the securing ring; and the locking member on the at least one end plate (5, 6) is embodied as a locking nose (11).

13. The filter element according to claim 1, wherein the filter body (14) is impregnated with phenolic resin.

14. The filter element according to claim 1, wherein the filter body (14) is comprised of nonwoven material.

15. The filter element according to claim 1, wherein a projection (20) is formed on a radially inwardly oriented inner side of the wall of the expansion opening delimiting the at least one expansion opening (9);

wherein said securing ring includes an annularly extending, axially projecting clamping stay (12) formed at a radial spacing to the outer rim;

wherein said clamping stay, when in a mounted position, rests on the filter body (14);

wherein in the clamping stay (12) at least one through opening (10) is provided;

wherein two concentric annular projections (21) are formed on a side of the clamping stay (12) facing the end plate (6);

wherein said at least one through opening is located between said two concentric annular projections; and wherein said at least one expansion opening (9) is positioned radially outside of the clamping stay (12).

16. The filter element according to claim 15, wherein said filter body (14) is ring shaped;

wherein an annular groove (13) is formed on the at least one end plate (6), said annular groove configured to receive said ring shaped filter body;

wherein the at least one flow passage (15) opens into the annular groove (13);

wherein the annular groove (13) is correlated with the clamping stay (12) on the securing ring (8) and is provided with grooves (19) that correspond with the annular projections (21);

wherein said securing ring includes a locking member that corresponds with a locking member on the at least one end plate (5, 6), said locking member on said securing ring acting with said corresponding locking member on said at least one end plate determining an unequivocal mounting position of the securing ring (8) on the at least one end plate;

wherein the locking member on the securing ring (8) is embodied as a locking recess (23) introduced into the outer rim of the securing ring; and the locking member on the at least one end plate (5, 6) is embodied as a locking nose (11).

17. A fuel filter (1) with a filter element (2) according to claim 1.

* * * * *